April 9, 1946.  P. DE ANGUERA  2,398,134
DRILLING MACHINE
Filed July 20, 1943
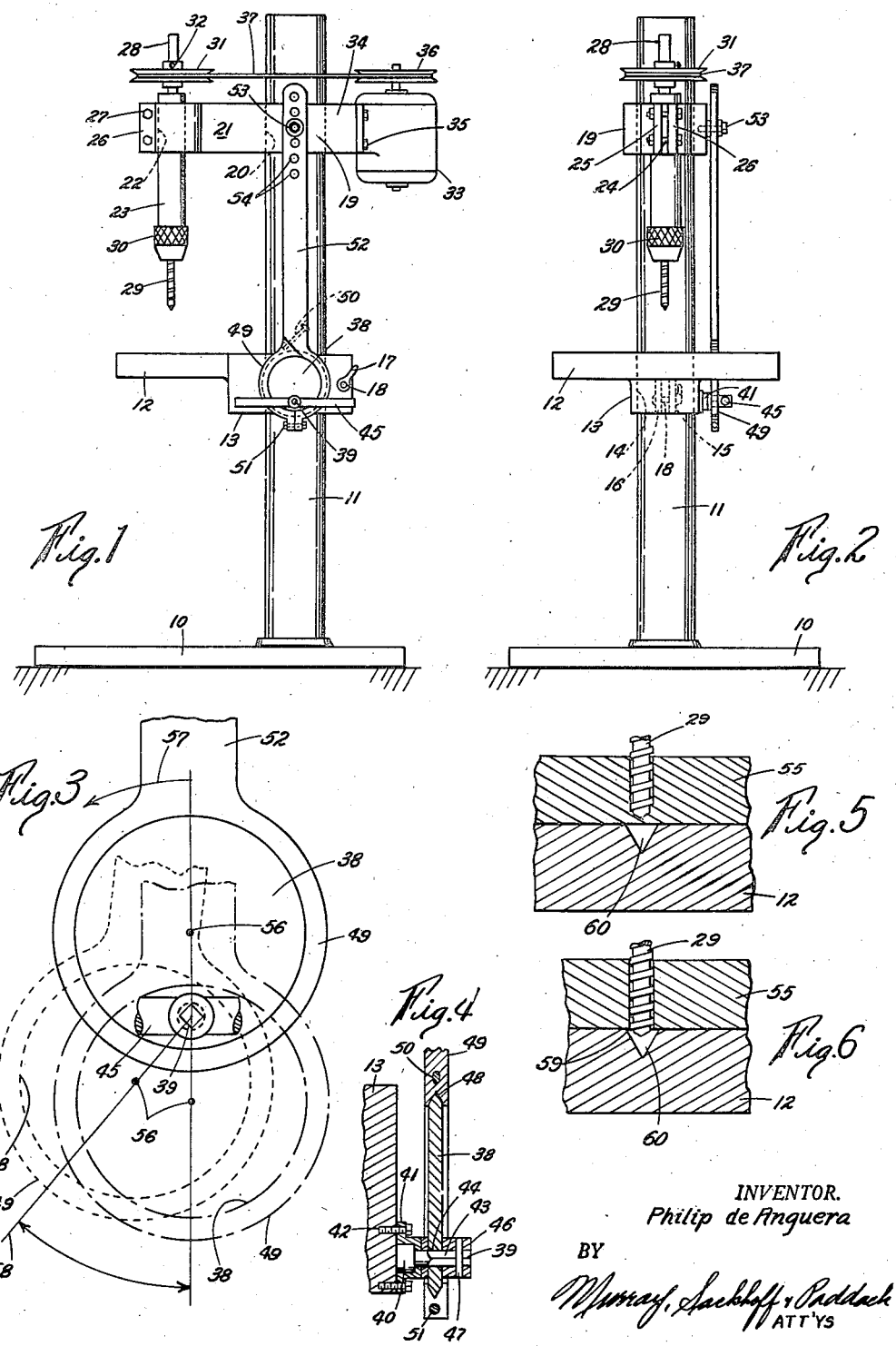
INVENTOR.
Philip de Anguera
BY
Murray, Sackhoff & Paddack
ATT'YS Patented Apr. 9, 1946

2,398,134

UNITED STATES PATENT OFFICE 2,398,134

DRILLING MACHINE

Philip de Anguera, Norwood, Ohio, assignor to Eva de Anguera, Norwood, Ohio

Application July 20, 1943, Serial No. 495,451

4 Claims. (Cl. 77—32)

This invention relates to drilling machines and is particularly directed to improvements in the feed and return mechanisms which actuate the drill heads in said machines.

Conventional drill presses are provided with drill feeding mechanisms which when uniformly operated feed the drill into the work at a constant rate of speed. These drill feed mechanisms when fed at a uniform rate tend to puncture the thin material of the work adjacent the exit point of the drill therefrom. This material is generally forced outwardly and creates a jagged burr around said drill exit end in the work, and the rotating drill quite frequently locks against this burred edge and results in the breaking of said drill. Operators of these drill feeding mechanisms recognize this fact and manually decelerate the actuating means of these machines at a position which they determine from experience to be the drill exit point from the work being bored. This approximation is not a positive one and results in loss of time, lessens the efficiency of the mechanism, and quite frequently a drill is broken.

It is therefore an object of the invention to provide a uniformly actuated mechanism which feeds the drill spindle at a uniformly decelerated rate of motion from a position adjacent its predetermined limit of motion in the work up to and including its position at said limit of motion to thereby obtain an improved drill feeding action during the last and critical phase of the feed stroke.

It is another object of the invention to provide in a machine for drilling holes through a piece of work a means for locating the lower limit of feed stroke movement of the drill at the exact point of exit of said drill from the work to prevent burring of the work around said exit point and thereby preclude the breaking of the drill.

Another object of the invention is to provide a simplified and composite machine for accomplishing the functions set forth in the foregoing objects.

Other objects will be apparent from the following specification and drawing, and in which:

Fig. 1 is a side elevational view of my drilling machine.

Fig. 2 is a front elevational view of the machine shown in Fig. 1.

Fig. 3 is an enlarged diagrammatic view of the feed and return mechanism for my drilling machine, the broken lines illustrating the positions taken by the mechanism during its drill feeding stroke.

Fig. 4 is an enlarged cross-sectional view of the feed and return mechanism.

Fig. 5 is an enlarged cross-sectional view of the drill during an intermediate stage of the drilling operation.

Fig. 6 is an enlarged cross-sectional view of the drill at its lower limit of its feed stroke motion.

The embodiment of my invention consists of a base 10 having an accurately ground cylindrical column 11 mounted on and extending vertically therefrom. A work table 12 is supported in vertically adjusted positions on the column by means of an integral block 13 having a column-engaging opening 14 formed therein. The block is split at its rear portion and is provided with two flanges 15 and 16, Fig. 2, which are brought together to clamp the block to the column by a wing nut 17 and its cooperating bolt 18.

A drill head 19 is positioned on the column for rectilinear vertical movement and is provided with a centrally disposed opening 20 for slidably receiving the column. The front extension 21 of the head is provided with an aperture 22 for receiving a sleeve 23, said extension being split at 24 and provided with two flanges 25 and 26. Cross bolts 27 engage the flanges and when tightened serve to clamp the split front extension of the head around the sleeve 23. Journaled in the sleeve by any suitable means is a drill spindle 28 which carries at its lower end a suitable drill 29, said drill being removably clamped to the spindle by a chuck 30. The spindle is driven by a pulley 31 clamped thereto by set screw 32. A motor 33 is mounted on the rear extension 34 of the head by bolts 35 and has a drive connection with the spindle pulley 31 through a pulley 36 and an endless belt 37.

The means for feeding and returning the head relative to the table 12 consists of a disc-shaped cam 38 which is eccentrically mounted for rotation on the block 13 by a stub shaft 39, Fig. 4. The shaft has a circular inner end 40 of enlarged proportions which rotates in a keeper 41 fastened to the block 13 by bolts 42. The outer end 43 of the shaft is square in cross-section and receives a square opening 44 formed through the cam. A lever 45 is fixed to the stub shaft at its hub portion 46 by means of a pin 47 which passes through the shaft and the hub. It will therefore be noted that manual operation of the lever 45 imparts a rotary motion to the eccentric cam 38 relative to the stationary table supporting block 13. The cam has a beveled periphery 48 which is freely engaged by a two-part circular follower 49, said parts being joined by means of bolts 50 and 51, Fig. 1. The follower is provided with an upwardly extending arm 52 which is pivotally fastened to the head 19 by a bolt 53. The relative vertical positions of the table and the drill head may be adjusted by passing the bolt 53 through any one of a number of spaced holes 54 formed through the upper end of the arm 52.

The operation of the feed and return mechanism and the location of the drill 29 in the work 55 during various phases of the drill feeding stroke of said mechanism will be understood by reference to Figs. 3, 5 and 6. In Fig. 3 the full line showing of the cam and follower indicates the position taken by the feed mechanism when the drill head is in its upper inoperative position as is the case in Figs. 1 and 2. In this position it will be noted that the eccentric axis 39, the true center 56 of the cam and the pivot bolt 53 connecting the arm 52 to the head 21 are all in vertical alignment and their position precludes movement between the head and table because the moving parts are in irreversible, dead-center alignment. To feed the drill into and through the work 55, Figs. 5 and 6, held upon the table 12, the cam is rotated at a uniform rate of speed on its eccentric axis through lever 45 or through a suitable motor driven connection in a clockwise or counter-clockwise direction. As illustrated in Fig. 3, the cam is rotated counter-clockwise in the direction of the arrow 57. By continuing this rotation the head is moved downwardly in a rectilinear direction until the drill engages and is entered into the upper surface of the work 55. When the cam reaches a position indicated by the reference line 58, drawn through the eccentric axis 39 and the true center of the cam, the drill will approximately assume the position indicated in Fig. 5. It will further be noted that after the cam has been rotated beyond the position in which its eccentric axis and the true center are in a line at right angles to their vertically aligned positions, assumed in their inoperative positions, a uniformly, decelerated drill action is imparted to the head by said cam. This uniformly decelerated movement has been partly accomplished when the cam and follower pass through the position indicated in dotted lines in Fig. 3 and continues by regular, decreasing intervals until the cam reaches its lower limit of motion indicated by dot and dash lines in said Fig. 3. In this last cam position the drill motion is stopped at the exact exit position 59, Fig. 6, in the work and it will be understood that the constantly actuated, and uniformly decelerated motion of said drill between a position adjacent its exit point and its position at said lower limit of motion permits the drill to slowly cut through the progressively decreasing thickness of the material in the work at the end of the bore being made therethrough which precludes the burring of the work around the drilled opening and prevents the drill from being broken by locking on the burred edge. A hole 60 is formed in the table in alignment with the drill exit position to preclude contact of the cutting edge of said drill with the table.

The means provided to locate the lower limit of motion of the drill at its exit point 59 in work of varying thicknesses is the vertical adjustment of the head and table through the pivot bolt 53 and the aligned holes formed in the arm. Fine adjustments are then made by varying the extension of the drill 29 in the chuck 30.

What is claimed is:

1. In a machine for drilling holes through a piece of metallic work the combination of a base, a vertical post on the base, a table mounted for vertical adjustment on the post, a head having a centrally disposed opening formed therein for slidably receiving the post, a drill spindle journaled in the forward portion of the head and disposed superjacent the table, a motor mounted on the rearwardly extending portion of the head and having a drive connection with the spindle, a rotatable cam, a pivot shaft rotatably mounted on the table and having an eccentric connection with the cam, a manual lever fixed to said shaft, a cam follower freely engaging the periphery of the cam, an arm extending from the follower, a plurality of adjustment holes formed through the free end of the arm, and a pivot bolt adapted for selective entrance into one of said holes and having a threaded connection with the head.

2. In a machine for drilling holes through a piece of work the combination of a base, a head mounted on the base for rectilinear movement, a spindle journaled in the head, means for feeding and returning the head relative to the work, said means comprising a disc-shaped cam, means for rotatably mounting the cam eccentrically on the base, a circular cam follower freely engaging the periphery of the cam, an arm on the follower, pivot means for the arm for adjustably connecting said arm to the head, a drill, a chuck carried by the spindle and adapted to mount the drill in a predetermined, axially extended position relative to the spindle dependent upon the adjusted position of the pivot means and cooperating with said pivot means to fix the limit of motion of the head feed stroke at the exact drill exit position in the work, means for actuating the cam, the eccentric axis and the pivotal connection between the head and the arm being in substantial lineal alignment with the actual center of the cam when said head is in its inoperative position or in the exact drill exit position, whereby said cam is adapted to feed the head with a uniformly decelerated movement adjacent and up to said drill exit position.

3. In a machine for drilling holes through metallic work the combination of a base, a table mounted on the base, a head guided for rectilinear movement on the base and having a slidable connection with said base intermediate its ends, a spindle journaled in the forward portion of the head and disposed superjacent the table, a motor mounted on the rearwardly extending portion of the head and having a drive connection with the spindle, means for feeding and returning the head relative to the work held upon the table, said means comprising a disc-shaped cam, eccentric means for rotatably mounting the cam on the table, a circular cam follower freely engaging the periphery of the cam, an arm on the follower, a pivotal connection between the arm and the head for adjustably connecting the head and the table, a drill, a chuck carried by the spindle and adapted to mount the drill in a predetermined, axially extended position relative to the table dependent upon the adjusted position of the pivot means and cooperating with said pivot means to fix the limit of motion of the feed head stroke at the exact drill exit position in the work, manual means for actuating the cam, the eccentric axis and the pivotal connection between the head and arm being in lineal alignment with the actual center of the cam when said head is in the exact drill exit position in the work, whereby said cam is adapted to feed the head with a uniformly decelerated movement between a point adjacent to and the actual drill exit position.

4. In a machine for drilling holes through metallic work the combination of a base, a stationary work mounting table on the base having a drill clearance hole formed in its work supporting surface, a head mounted on the base for rectilinear movement, a spindle journaled in the head, a drill, a chuck carried by the spindle and adapted to mount the drill in a predetermined, axially extended position relative to the spindle, a feed and return means associated with the table, said means comprising a disc-shaped cam, means eccentrically journaling the cam on the table, manual means for actuating the cam, a circular cam follower freely engaging the periphery of the cam, an arm extending from the follower, a plurality of adjustment holes formed through the free end of the arm, a pivot bolt adapted for selective entrance into one of said holes and having a threaded connection with the head, the predetermined, axially extended position of the spindle being dependent upon the selective entrance of the pivot bolt in the holes of the arm to fix the limit of motion of the head feed stroke at the exact drill exit position in the work, the eccentric axis and the pivot bolt connection between the head and the arm being in lineal alignment with the actual center of the cam when said head is in the exact drill exit position in the work whereby said cam is adapted to feed the drill from a point adjacent its exit in the work to said exit point with a uniformly, decelerated movement which continues to decrease by regular intervals until the drill stops at its said exit point.

PHILIP DE ANGUERA.